United States Patent
Van De Sande

(10) Patent No.: US 8,040,971 B2
(45) Date of Patent: Oct. 18, 2011

(54) HIGH PERFORMANCE MIXED SIGNAL CIRCUIT

(75) Inventor: Frank Van De Sande, Rotselaar (BE)

(73) Assignee: Agilent Technologies, Inc., Santa Clara, CA (US)

( * ) Notice: Subject to any disclaimer, the term of this patent is extended or adjusted under 35 U.S.C. 154(b) by 665 days.

(21) Appl. No.: 12/115,284

(22) Filed: May 5, 2008

(65) Prior Publication Data

US 2009/0021285 A1     Jan. 22, 2009

(30) Foreign Application Priority Data

May 23, 2007   (GB) .................................. 0709847.8

(51) Int. Cl.
*G06F 1/02*       (2006.01)
*H03B 21/00*      (2006.01)
*H04B 1/10*       (2006.01)
*H04L 27/00*      (2006.01)

(52) U.S. Cl. ......... 375/295; 327/107; 327/551; 708/271

(58) Field of Classification Search .................. 375/295, 375/296; 327/105, 107, 551; 708/271
See application file for complete search history.

(56) References Cited

U.S. PATENT DOCUMENTS 5,761,101 A *   6/1998  Erhage ........................ 708/276
6,522,176 B1    2/2003  Davis

OTHER PUBLICATIONS

Great Britain search report dated Sep. 18, 2007.

* cited by examiner

*Primary Examiner* — David Lugo

(57) ABSTRACT

The present invention is related to a digital circuit for use in a mixed-signal circuit. The digital circuit comprises:
  a first circuit for direct digital synthesis comprising a first phase generator (PG1) arranged for being fed with a phase generator input signal, a first phase-to-amplitude converter (PAC1) arranged for being fed with a phase from the first phase generator and for generating a first carrier wave output, and first signal combining means (R1) for combining the first carrier wave output with a first input signal,
  a noise generator (NG) arranged for generating a pseudo-random noise signal,
  combining means (S) for combining the pseudo-random noise signal and the phase generator input signal such that the phase generator input signal to the first phase generator (PG1) is randomised,
  a second circuit for direct digital synthesis comprising a second phase generator (PG2) arranged for being fed with the pseudo-random noise signal, a second phase-to-amplitude converter (PAC2) arranged for being fed with a phase from the second phase generator and for generating a second carrier wave output, and second signal combining means (R2) for combining the second carrier wave output with a second input signal, whereby the second carrier wave output combined with the second input signal is comprised in the first input signal.

10 Claims, 3 Drawing Sheets

HIGH PERFORMANCE MIXED SIGNAL CIRCUIT

This application claims priority from Great Britian patent Application, No. GB 0709847.8 filed on 23 May 2007, which is incorporated by refernce in its entirety.

FIELD OF THE INVENTION

The present invention relates to a mixed-signal circuit wherein direct digital synthesis is applied.

STATE OF THE ART

In a mixed-signal environment state transitions in digital circuitry are an important origin for spurious components that are injected into analog circuitry. This is true, especially in mixed-signal integrated circuits (ICs) where the substrate constitutes a transmission path between the digital and analog circuitry.

There are various mechanisms through which spurious signals are injected:
- during digital transitions (1->0 and 0->1), both NMOS and PMOS transistors conduct and a current flows from $V_{dd}$ to $V_{ss}$. This current surge, together with power supply parasitics causes ringing on $V_{dd}$ and $V_{ss}$ lines. Bounces on $V_{dd}$ and $V_{ss}$ lines are injected into the substrate.
- capacitive coupling via drain regions
- impact ionization These mechanisms occur for every switching gate.

In data converters (DAC, ADC) with on-chip digital signal processing, there is also a concern regarding data-dependent power dissipation in the digital portions that can induce temperature variations and other deleterious effects in the analog circuitry.

In signal source applications, the generation of a carrier wave (CW) signal often requires extremely high signal fidelity, so the carrier wave application is very sensitive to the abovementioned spurious mechanisms. The spur introduction in itself is a concern, but often it is the data-dependent character that needs to be addressed, by trading off a higher noise floor for a better Spurious Free Dynamic Range (SFDR). There is a major challenge to reduce the data-dependent digital activity and temperature variations with an acceptable cost in digital resources.

Direct Digital Synthesis (DDS) is a flexible technique to generate carrier wave (CW) signals. A CW signal is generated according to Equation 1:

$$cw(kT)=e^{j2\pi p(kT)}=\cos(2\pi p(kT))+j\sin(2\pi p(kT)) \qquad (\text{eq. 1})$$

where p(kT) denotes the phase of the CW signal at time instant kT, with T the period of the sampling clock Clk and k an integer number. Note that $F_{clk}=1/T$ is the sample rate frequency.

Figure 1:
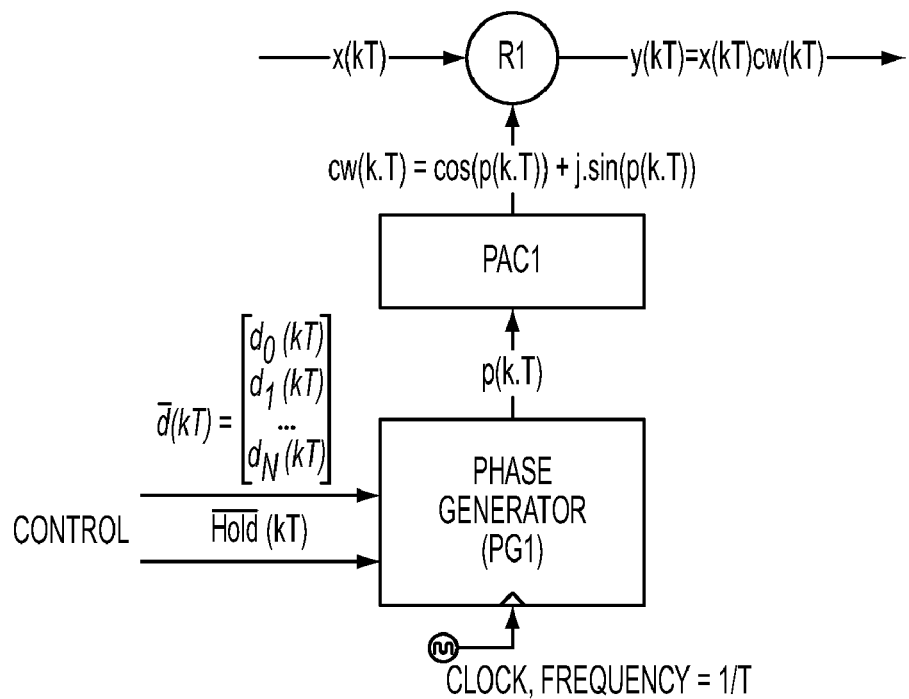

The digital circuitry supporting DDS based modulation is shown in FIG. 1. It includes a phase generator (PG1), a phase-to-amplitude converter (PAC1) and a rotator (R1). The input signals to the phase generator, $\overline{d}(kT)$ and $\overline{Hold}(kT)$, are vectors of dimension (N+1)x1. They control the $N^{th}$ order phase trajectory p(kT). The output signal y(kT) is the result of the CW signal after modulation with the x(kT) input signal.

Figure 2:
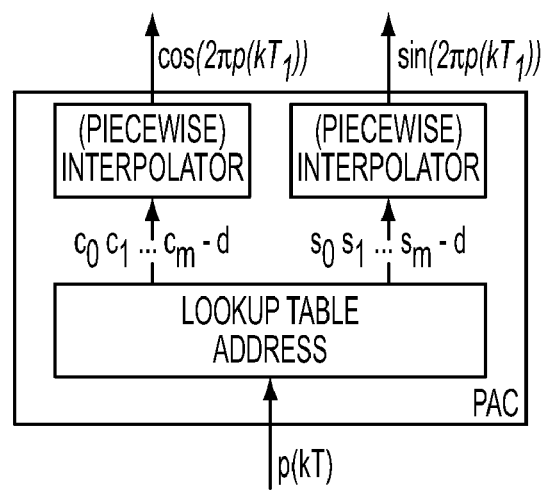

The phase-to-amplitude converter generates the cw(kT) signal, given a phase input signal p(kT). As shown in FIG. 2, it is typically implemented using a lookup table (ROM or synthesized logic) with the phase p(kT) applied to its address input. The lookup table output is two sets of m polynomial coefficients [c0 c1 c2 ... cm−1] and [s0 s1 s2 sm−1]. These two coefficient sets are then used to compute the cosine and sine signals, respectively, with (piecewise) $m^{th}$ order polynomial approximation (e.g. Taylor, spline, ... ).

Figure 3:
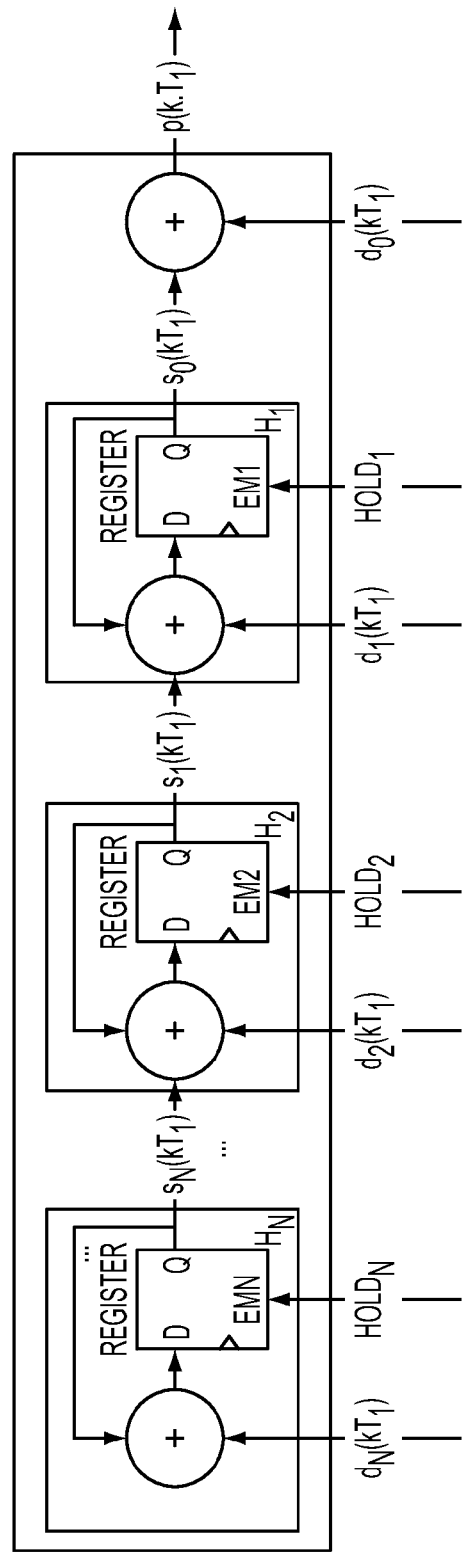

FIG. 3 shows the internal structure of the phase generator, which, for an $N^{th}$ order phase trajectory, is a concatenation of N accumulator stages. Each stage has the same transfer function $H(z)=H_N(z)= \ldots =H_2(z)=H_1(z)$. The transfer function H(z) is shown in Equation 2.

$$H(z) = \frac{P_{i-1}(z)}{P_i(z)} = \frac{z^{-1}}{1-z^{-1}} \qquad (\text{eq. 2})$$

Input tuning words $d_i(kT)$ control the phase trajectory via the control port, e.g. to induce phase hops, frequency hops, frequency sweeps etc. Although the cw(kT) signal may wiggle fast and mandate a high sample rate 1/T, the tuning words $d_i$ may have relatively low bandwidths that can be accommodated with a shared control port. Note that since the $2\Pi$ factor is taken into account in the phase-to-amplitude converter, all inputs, outputs and internal signals of the phase generator are in the range [−0.5, 0.5]. The optional $Hold_i$ signals provide additional control to either let computation proceed or hold the different stage states. Equation 3 shows the relationship between the z-transforms of the tuning word inputs $D_i(z)$ and the phase output P(z).

$$P(z) = \sum_{i=0}^{N} \left(\frac{z^{-1}}{1-z^{-1}}\right)^i D_i(z) \qquad (\text{eq. 3})$$

When the rotator R1 (FIG. 1) is a complex multiplier, it modulates the CW signal with the input signal x(kT) as shown in Equation 4.

$$y(kT)=cw(kT)x(kT) \qquad (\text{eq. 4})$$

Substitution of Equations 1 and 3 into Equation 4 results in Equation 5, which shows the relation between the tuning words $d_i$ and the output y(kT).

$$y(kT) = e^{j2\pi \cdot Z^{-1}\left(\sum_{i=0}^{N}\left(\frac{z^{-1}}{1-z^{-1}}\right)^i D_i(z)\right)} x(kT) \qquad (\text{eq. 5})$$

Note that when the input signal x(kT) has a real or complex constant value, the rotator R1 resolves into a real or complex multiplier with constant factor. In case the constant value equals 1, the rotator R1 resolves altogether and $y(kT)=cw(kT)=e^{j2\pi p(kT)}$.

The following data type convention for signed fixed point data type is introduced s<wl,iwl> whereby wl represents the total word length, used for fixed point representation. It is equivalent to the total number of bits used in the type. The iwl notation denotes the integer word length and specifies the number of bits that are to the left of the binary point (.) in a fixed point number.

The phase signal p(kT) is of type s<wl, 0>, representing a value $.x_0 xxxxxxx_{wl-1}$ with a signed range $[-2^{-1}, 2^{-1}-2^{-wl}]$. This, combined with an implicit $2\pi$ multiplication in the PAC, results in a phase range $[-\pi, \pi]$, as required. So the integer bits of p(kT) can be neglected, as is the case for all signals $s_i(kT)$ and $d_i(kT)$ in FIG. 3. The desired spurious performance drives the word lengths.

AIMS OF THE INVENTION

The present invention aims to provide a digital circuit for use in a mixed-signal circuit with improved performance. The invention further aims to provide a method for reducing the data dependency of toggle activity in a mixed-signal circuit.

SUMMARY OF THE INVENTION

The present invention is related to a digital circuit for use in a mixed-signal circuit. The digital circuit comprises:
- a first circuit for direct digital synthesis comprising a first phase generator arranged for being fed with a phase generator input signal, a first phase-to-amplitude converter arranged for being fed with a phase from the first phase generator and for generating a first carrier wave output, and first signal combining means for combining the first carrier wave output with a first input signal,
- a noise generator arranged for generating a pseudo-random noise signal,
- combining means for combining the pseudo-random noise signal and the phase generator input signal such that the phase generator input signal to the first phase generator is randomised,
- a second circuit for direct digital synthesis comprising a second phase generator arranged for being fed with the pseudo-random noise signal, a second phase-to-amplitude converter arranged for being fed with a phase from the second phase generator and for generating a second carrier wave output, and second signal combining means for combining the second carrier wave output with a second input signal, whereby the second carrier wave output combined with the second input signal is comprised in the first input signal.

In a preferred embodiment the first and second phase generator are further arranged for receiving a control signal for proceeding with or holding a computation.

The combining means preferably is a subtractor or an adder.

Advantageously the phase from said first or second phase generator is represented a number between −0.5 and 0.5.

In a specific embodiment the pseudo-random noise signal is a vector signal composed of one-bit elements.

In an advantageous embodiment the first and second phase-to-amplitude converters each comprise a lookup table wherein sine and cosine values are stored with a phase offset.

In an advantageous embodiment the first and second signal combining means are rotators arranged for modulating an input signal on a carrier wave output by the phase-to-amplitude converters.

The invention also relates to a mixed-signal circuit and to an integrated circuit comprising the digital circuit as previously described.

In a second aspect the invention relates to a method for reducing data dependency of toggle activity in a mixed signal circuit comprising a first circuit for direct digital synthesis. The method comprises the steps of applying a randomised signal to a phase generator of the first circuit for direct digital synthesis by combining the initial phase generator input signal with a pseudo-random noise signal and by feeding the pseudo-random noise signal to a second circuit for direct digital synthesis such that perturbation caused by applying the randomised signal to the first circuit is compensated for.

SHORT DESCRIPTION OF THE DRAWINGS

Figure 4:
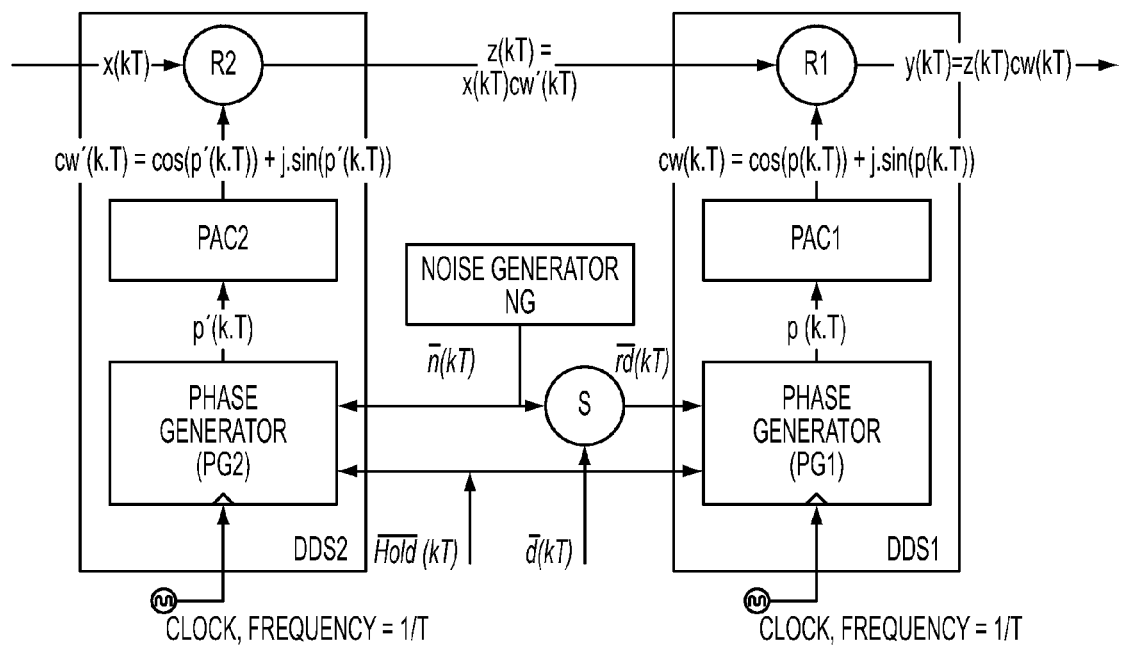

FIG. 1 represents a general DDS modulator scheme.
FIG. 2 represents a phase-to-amplitude converter.
FIG. 3 represents a phase generator for an $N^{th}$ order phase trajectory.
FIG. 4 represents a DDS modulator according to the invention.

DETAILED DESCRIPTION OF THE INVENTION

The present invention proposes digital circuitry wherein the detrimental effects of spurious signals in associated mixed-signal circuitry are drastically reduced. The proposed design displays an improved performance by achieving the following assets:
- reducing the data dependency of toggle activity, and
- equalizing the digital activity over time FIG. 4 shows a DDS based modulator circuit which allows reducing the data dependency of the toggle activity. The DDS1 circuitry, comprising R1, PAC1 and PG1, is exactly the same as in the original circuit in FIG. 1.

The Noise Generator (NG) generates a vector signal $\bar{n}(kT)=[n_0(kT)\ n_1(kT)\ \ldots\ n_N(kT)]^T$. Generally this signal would be provided by a long PN generator to make it noise-like.

The Subtractor (S) (or alternatively an adder) is a vector operator that perturbates the input signal $\bar{d}(kT)$ with $\bar{n}(kT)$ into a randomized vector signal $\bar{rd}(kT)=\bar{d}(kT)-\bar{n}(kT)$, which is then applied to the DDS circuitry. This disconnects the actual level of activity in DDS1 from the actual input signal $\bar{d}(kT)$. Note that no larger word widths in DDS1 are required than before.

To compensate for the perturbation on the tuning words that are applied to DDS1, compensation circuitry DDS2 is devised such that equations 6 and 7 both apply.

$$y(kT) = e^{j2\pi \cdot Z^{-1}\left(\sum_{i=0}^{N}\left(\frac{z^{-1}}{1-z^{-1}}\right)^i (D_i(z)-N_i(z))\right)} z(kT) \quad (6)$$

$$z(kT) = e^{j2\pi \cdot Z^{-1}\left(\sum_{i=0}^{N}\left(\frac{z^{-1}}{1-z^{-1}}\right)^i N_i(z)\right)} x(kT) \quad (7)$$

The $N_i(kT)$ noise signals cause a y(kT) perturbation which is the complex conjugate of the z(kT). This phase inversion can be implemented in different places: in the phase-amplitude-converter PAC2, in rotator R2 or, as in FIG. 4, in the subtractor S. As in DDS1, the rotator R2 in DDS2 is a complex multiplier. However, as set out above it may also resolve into a simple pass-through.

Substituting Equation (6) into (7) results in Equation (8), which is the relationship between the input signals $D_i(z)$ and x(kT) and the output signal y(kT).

$$y(kT) = e^{j2\pi \cdot Z^{-1}\left(\sum_{i=0}^{N}\left(\frac{z^{-1}}{1-z^{-1}}\right)^i D_i(z)\right)} x(kT) \quad (8)$$

Equation (8) is identical to Equation (5), so while the internal signals in FIG. 4 are thoroughly randomized, the input-output behaviour is the same as in FIG. 1, as desired.

Although DDS2 needs to have the same input-output behaviour as DDS1 has (if phase inversion is not taken into account), the cost (area, power consumption) can be severely reduced versus a mere duplication of DDS1. The domains of $n_i(kT)$ values do not necessarily need to be the same as the $d_i(kT)$ domains, meaning that each $n_i(kT)$ may have its specific word width (including zero width). For instance, if none of the randomization signals $n_i(kT)$ is of type $<wl_i, 0>$ with $wl_i>1$, then all signals and operators in PG2 will only be one bit wide. Likewise, PAC2 and R2 will degenerate in very small logic since $p'(kT)$ and $cw'(kT)$ only have two possible values.

The $n_i(kT)$ signal types control the trade-off between the randomization degree and the incremental area cost. The choice is determined by heuristic and experimentation.

Further measures can be taken in order to improve the performance of the proposed design. In two's complement arithmetic, a higher than average toggle density occurs in a particular signal at a zero crossing between two small absolute values. For instance, a transition from the largest negative value 0xFFFFFFFFFFFF to the smallest positive value 0x000000000000 has the maximal amount of transitions. Since $\sin(p(kT)) \approx p(kT)$ for $|p(kT)| \approx 0$, this toggle intensive zone for the phase generator and the phase-amplitude converter coincide. Given the periodic nature of these signals, this may cause spurs in the frequency domain. A way to address this issue is to store the values in the phase-to-amplitude converter with a phase shift of $\pi/4$. In other words, rather than computing (Eq. 1), the design computes Eq. 9.

$$cw(kT) = \cos\left(2\pi p(kT) + \frac{\pi}{4}\right) + j\sin\left(2\pi p(kT) + \frac{\pi}{4}\right) \quad \text{(Eq. 9)}$$

The user can then compensate for the phase difference via the $d_i(kT)$ tuning words.

The invention claimed is:

1. A digital circuit for use in a mixed-signal circuit, said digital circuit comprising
    a first circuit for direct digital synthesis comprising a first phase generator arranged for being fed with a phase generator input signal, a first phase-to-amplitude converter arranged for being fed with a phase from said first phase generator and for generating a first carrier wave output, and first signal combining means for combining said first carrier wave output with a first input signal,
    a noise generator arranged for generating a pseudo-random noise signal,
    combining means for combining said pseudo-random noise signal and said phase generator input signal such that said phase generator input signal to said first phase generator is randomised,
    a second circuit for direct digital synthesis comprising a second phase generator arranged for being fed with said pseudo-random noise signal, a second phase-to-amplitude converter arranged for being fed with a phase from said second phase generator and for generating a second carrier wave output, and second signal combining means for combining said second carrier wave output with a second input signal, whereby said second carrier wave output combined with said second input signal is comprised in said first input signal.

2. The digital circuit of claim 1, whereby said first and second phase generator are further arranged for receiving a control signal.

3. The digital circuit as in claim 1, wherein said combining means is an adder or a subtractor.

4. The digital circuit as in claim 1, wherein said phase from said first or second phase generator is represented a number between −0.5 and 0.5.

5. The digital circuit as in claim 1, whereby said pseudo-random noise signal is a vector signal composed of one-bit elements.

6. The digital circuit as in claim 1, whereby said first and second phase-to-amplitude converters (PAC1, PAC2) each comprise a lookup table wherein sine and cosine values are stored with a phase offset.

7. The digital circuit as in claim 1, whereby said first and second signal combining means are rotators arranged for modulating an input signal on a carrier wave.

8. A mixed-signal circuit comprising the digital circuit as in claim 1.

9. An integrated circuit comprising the digital circuit as in claim 1.

10. A method for reducing data dependency of toggle activity in a mixed signal circuit, said method comprising:
    feeding a first phase generator with a phase generator input signal;
    feeding a first phase-to-amplitude converter with a phase from said first phase generator and generating a first carrier wave output;
    combining said first carrier wave output with a first input signal;
    generating a pseudo-random noise signal;
    combining said pseudo-random noise signal and said phase generator input signal such that said phase generator input signal is randomized;
    feeding a second phase generator with said pseudo-random noise signal;
    feeding a second phase-to-amplitude converter with a phase from said second phase generator and generating a second carrier wave output; and
    combining said second carrier wave output with a second input signal, whereby said second carrier wave output combined with said second input signal is comprised in said first input signal,
    such that perturbation caused by applying said randomised signal to said first circuit is compensated for.

* * * * *

UNITED STATES PATENT AND TRADEMARK OFFICE
CERTIFICATE OF CORRECTION

| | | |
|---|---|---|
| PATENT NO. | : 8,040,971 B2 | Page 1 of 1 |
| APPLICATION NO. | : 12/115284 | |
| DATED | : October 18, 2011 | |
| INVENTOR(S) | : Frank Van De Sande | |

It is certified that error appears in the above-identified patent and that said Letters Patent is hereby corrected as shown below:

In column 1, line 4, delete "Britian" and insert -- Britain --, therefor.

In column 1, line 6, delete "refernce" and insert -- reference --, therefor.

Signed and Sealed this
Twenty-second Day of November, 2011

David J. Kappos
*Director of the United States Patent and Trademark Office*